United States Patent [19]
Chen et al.

[11] Patent Number: 6,116,942
[45] Date of Patent: Sep. 12, 2000

[54] LOCKING DEVICE FOR ELECTRICAL CONNECTOR

[75] Inventors: Su-Ping Chen; Thomas R. L. Tsai, both of Tu-Chen, Taiwan

[73] Assignee: Hon Hai Precision Ind. Co., Ltd., Taipei Hsien, Taiwan

[21] Appl. No.: 09/305,155

[22] Filed: May 4, 1999

[30] Foreign Application Priority Data

May 8, 1998 [TW] Taiwan ................................ 87207131

[51] Int. Cl.⁷ ................................................ H01R 13/627
[52] U.S. Cl. ........................ 439/362; 439/953; 411/271; 411/395
[58] Field of Search .................... 439/362, 364, 439/365, 953; 411/57.1, 60.1, 80.6, 271, 383, 395, 396, 403

[56] References Cited

U.S. PATENT DOCUMENTS 1,188,611   6/1916   Berry ........................................ 439/271
1,409,817   3/1922   Bilterman ................................ 439/271

Primary Examiner—Lincoln Donovan
Assistant Examiner—Javaid Nasri
Attorney, Agent, or Firm—Wei Te Chung

[57] ABSTRACT

A locking device for an electrical connector comprises an engaging rod defining an outer screw thread thereon for engaging with a bolt of a mating connector defining an inner screw thread therein, and an additional inserting rod inserted into the engaging rod. The engaging rod comprises a through hole and a pair of gradually narrowed slots disposed around an end thereof in communication with the through hole. The inserting rod is inserted into the through hole of the engaging rod to expand the slots whereby the outer screw thread of the engaging rod latchably engages the inner screw thread defined in a screw hole of the bolt thereby securing the electrical connector and the mating connector together.

7 Claims, 7 Drawing Sheets

LOCKING DEVICE FOR ELECTRICAL CONNECTOR

BACKGROUND OF THE INVENTION

The present invention relates to a locking device for an electrical connector, and more particularly to a locking device for a cable connector for facilitating assembly.

DESCRIPTION OF PRIOR ART

Cable connectors are commonly used in electronic assemblies, such as computers, for connecting various electronic components, such as printers, memory units, and display units, to another unit, such as a central processor of a computer. A locking device is commonly used for securely engaging a cable connector with a mating connector to overcome an insufficient mating force between the two connectors.

A conventional locking device comprising an engaging rod 94, is shown in FIG. 7. The engaging rod 94 is adapted for connecting a cable connector 92 to a plug connector 91 by engaging with a bolt 93. The plug connector 91 is attached to a rear panel (not shown) of a computer housing by the bolts 93 extending through a pair of spaced apertures 911 disposed in opposite ends of the plug connector 91. The engaging rod 94 has an outer screw thread 941 formed on an end portion thereof. The bolt 93 has a screw hole 931 with an inner screw thread (not labeled) defined therein. In assembly, the engaging rods 94 extend through a pair of spaced holes 921 disposed in opposite ends of the cable connector 92 and the screw holes 931 of the bolts 93. The engaging rod 94 is then rotated with regard to the bolt 93 to threadedly engage the outer screw thread 941 thereof with the inner screw thread of the bolt 93 thereby securing the cable connector 92 and the plug connector 91 together. Such an assembly method is not only laborious, but also time consuming, and the same problem occurs when maintenance or disassembly of the cable connector is required. Hence, an improved locking device for facilitating assembly and maintenance of an electrical connector is desired.

SUMMARY OF THE INVENTION

Accordingly, an object of the present invention is to provide a locking device for facilitating assembly of electrical connectors.

Another object of the present invention is to provide a locking device for reliably connecting a cable connector to a mating plug connector by a simple linear movement of an additional inserting rod without modification to the plug connector.

In order to achieve the objects set forth, a locking device for an electrical connector in accordance with embodiments of the present invention comprises an engaging rod defining an outer screw thread thereon for engaging with a bolt of a mating connector defining an inner screw thread therein, and an additional inserting rod inserted into the engaging rod. The engaging rod comprises a through hole and a pair of gradually narrowed slots disposed around an end thereof in communication with the through hole. The inserting rod is inserted into the through hole of the engaging rod to expand the slots whereby the outer screw thread of the engaging rod latchably engages the inner screw thread defined in a screw hole of the bolt thereby securing the electrical connector and the mating connector together.

Other objects, advantages and novel features of the invention will become more apparent from the following detailed description when taken in conjunction with the accompanying drawings.

DETAILED DESCRIPTION OF THE EMBODIMENTS

Figure 1:
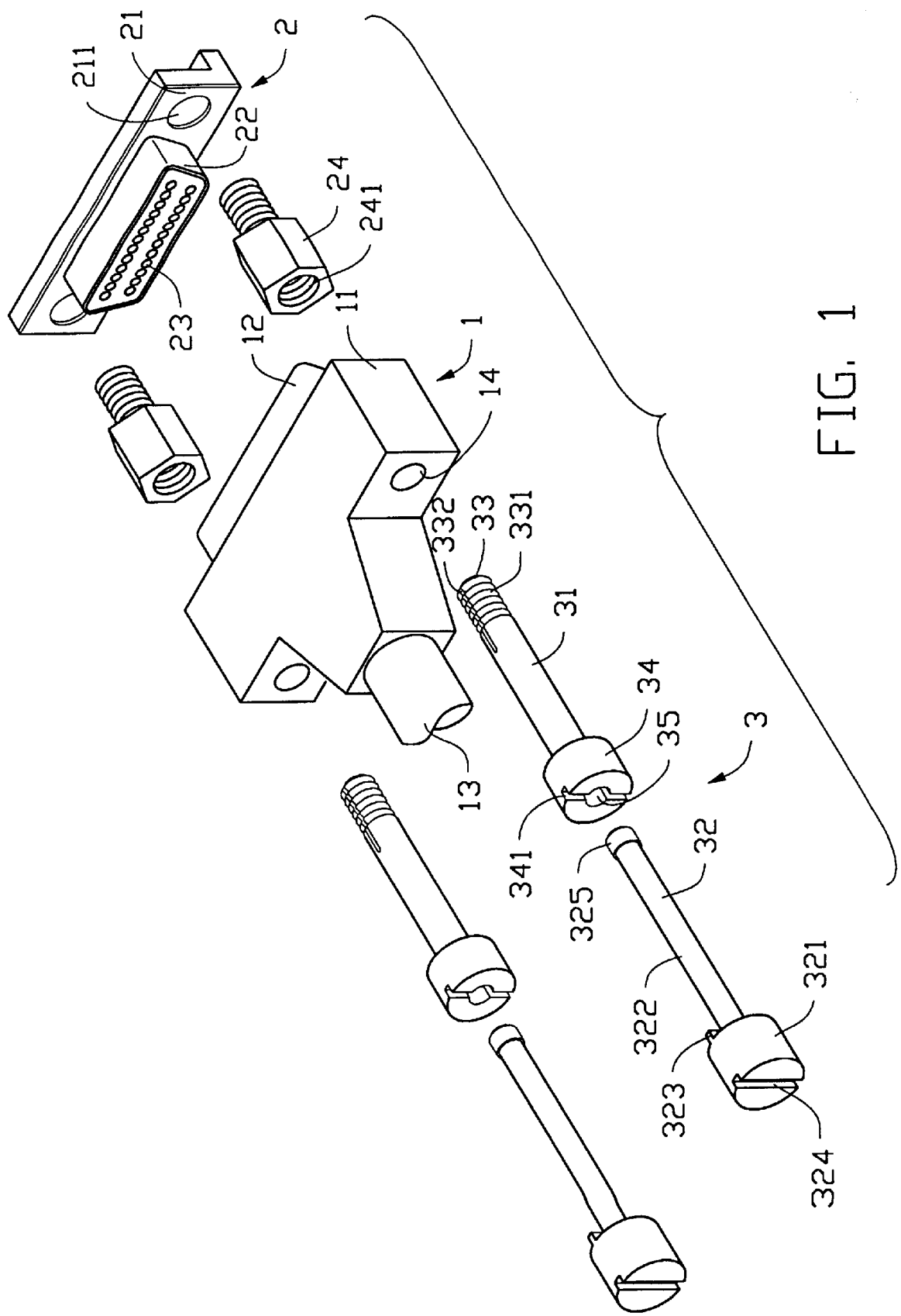
FIG. 1 is an exploded view of a connector assembly in accordance with a first embodiment of the present invention.

For facilitating understanding, like components are designated by like reference numerals throughout the various embodiments of the invention as shown in the attached drawings. Referring to FIG. 1, a connector assembly comprises a cable connector 1, a plug connector 2 and a locking device 3 in accordance with a first embodiment of the present invention for fastening the cable connector 1 and the plug connector 2 together. The cable connector 1 comprises an insulative housing 11, a shroud 12 projecting from the housing 11 with a plurality of terminals (not shown) received therein, and a cable 13. A pair of spaced holes 14 is disposed in opposite ends of the housing 11 for extension of the locking device 3 therethrough. The plug connector 2 comprises a flange 21, a D-shaped shell 22 projecting from the flange 21 and a pair of bolts 24. A pair of spaced apertures 211 is disposed in the flange 21 in alignment with the holes 14 of the cable connector 1. The shell 22 defines a plurality of passageways 23 for receiving the corresponding terminals of the cable connector 1. The bolts 24 are adapted to extend through the apertures 211 to attach the plug connector 2 to a rear panel of a computer housing (not shown). A screw hole 241 having an inner screw thread (not labeled) is disposed in each bolt 24 for engaging with the locking device 3 thereby fastening the cable connector 1 and the plug connector 2 together.

Figure 2:
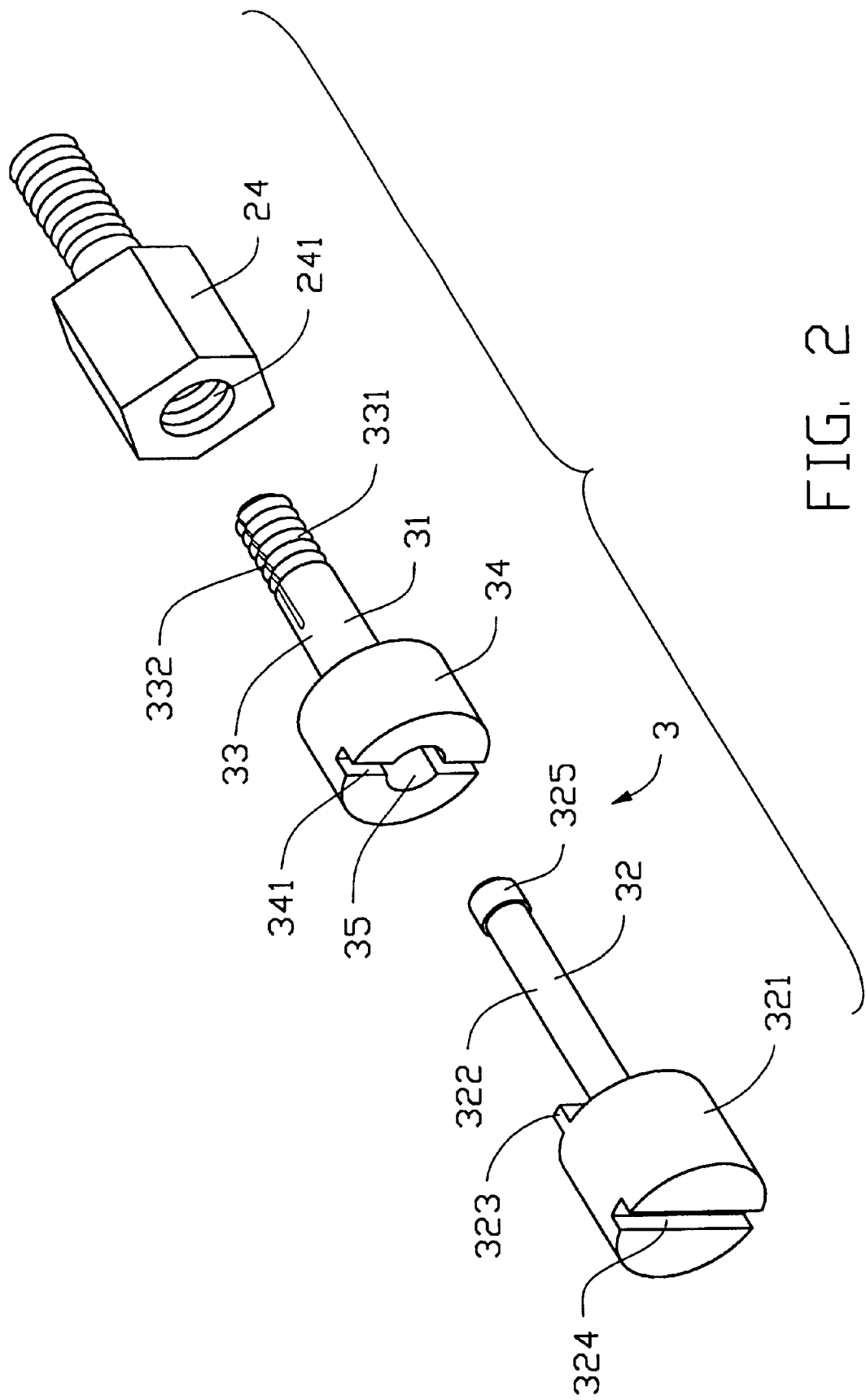
FIG. 2 is an exploded view of a locking device in accordance with the first embodiment and a bolt.
Figure 3:
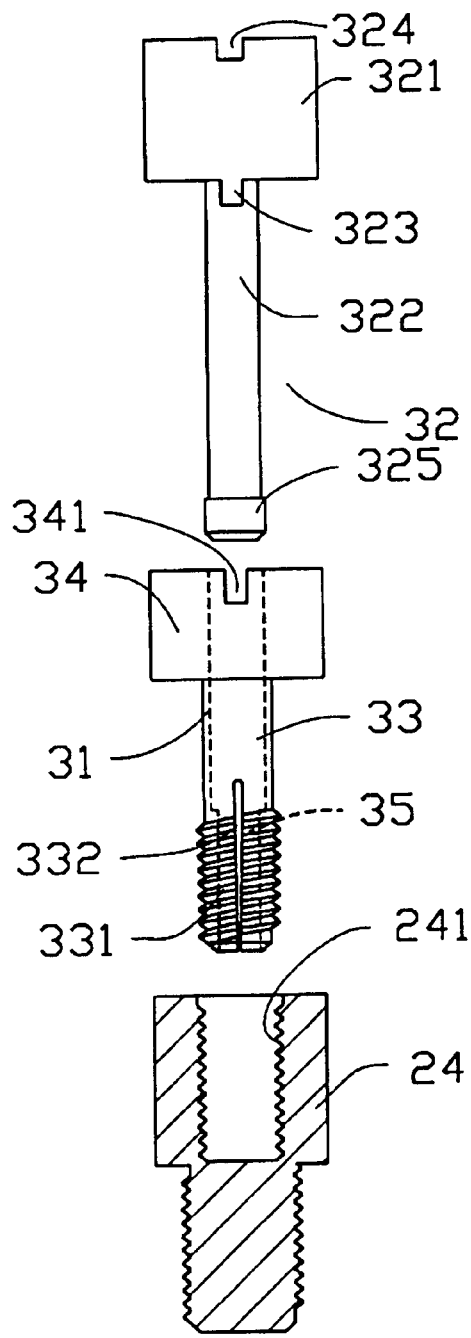
FIG. 3 is an exploded, plan view of the locking device with the bolt shown in cross-section to reveal an inner screw thread thereof.
Figure 8:
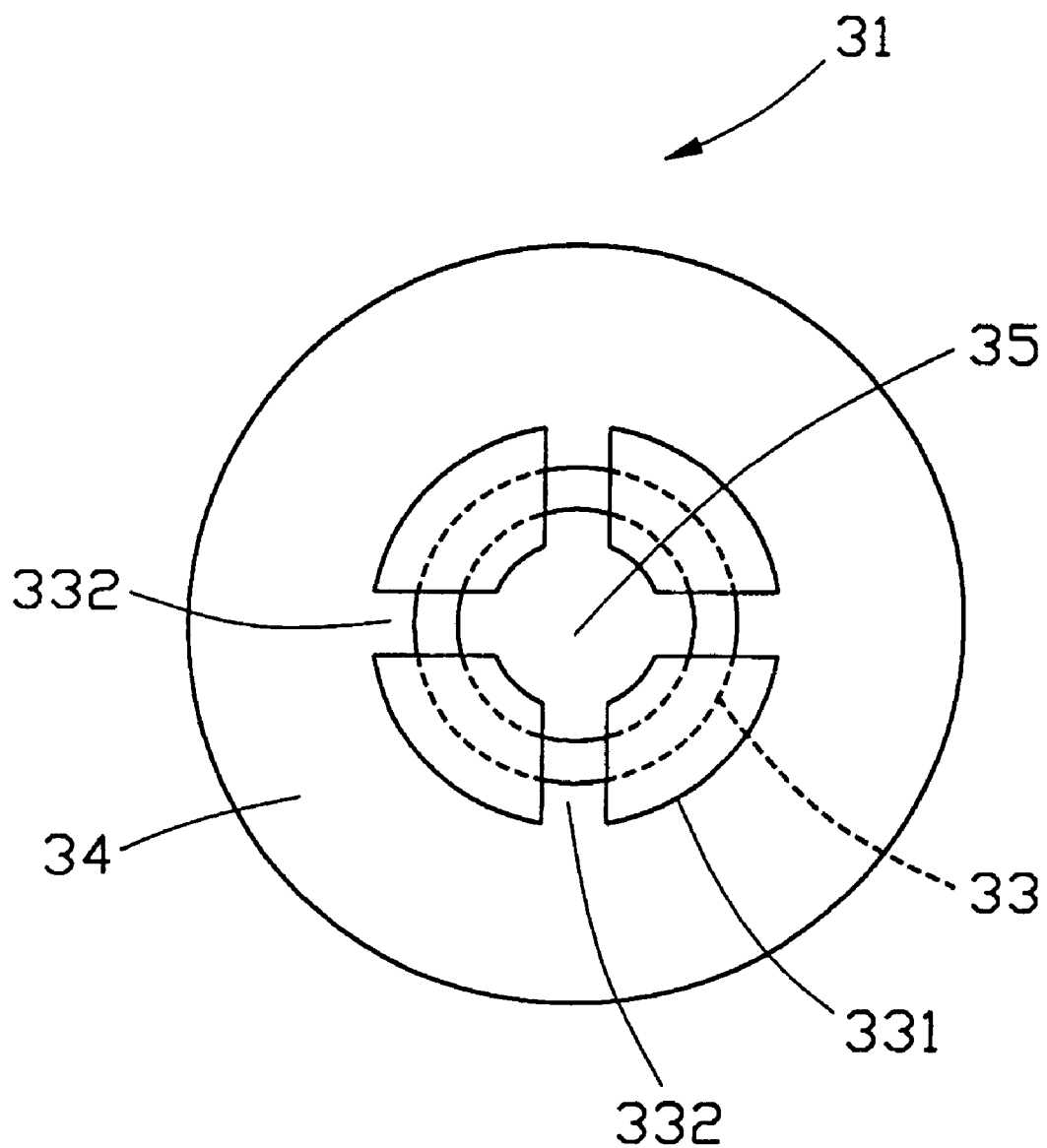
FIG. 8 is an enlarged bottom plan view of an alternative engaging rod of the locking device illustrating four slots equidistantly disposed in an end portion thereof.

Also referring to FIGS. 2 and 3, the locking device 3 for mating with the bolt 24 comprises an engaging rod 31 and an additional inserting rod 32 for insertion into the engaging rod 31. The engaging rod 31 comprises a post 33, a head 34 and a through hole 35 defined through the post 33 and the head 34. The post 33 comprises an outer screw thread 331 formed around a free end thereof for engaging the inner screw thread of the bolt 24, and a pair of elongate slots 332 formed around the free end thereof at an equal interval in communication with the through hole 35. Alternatively, as shown in FIG. 8 the post 33 comprises four equidistantly disposed slots 332. Each slot 332 gradually narrows along the post 33 in a direction away from the head 34, best seen in FIG. 3, whereby the through hole 35 in the free end has a diameter smaller than that of the through hole 35 in the rest of the post 33. A U-shaped engaging groove 341 is disposed in a top surface of the head 34 in communication with the through hole 35. The inserting rod 32 comprises a cap 321 and a pole 322. An engaging block 323 is formed on a bottom surface of the cap 321 for engaging with the groove 341 of the engaging rod 31. A recess 324 is disposed in a top surface of the cap 321 whereby the inserting rod 32 can be rotated by an external tool (not shown). A free end 325 of the pole 322 opposite the cap 321 has a diameter larger than the rest of the pole 322 and substantially equal to the diameter of the through hole 35 of the engaging rod 31.

Figure 4:
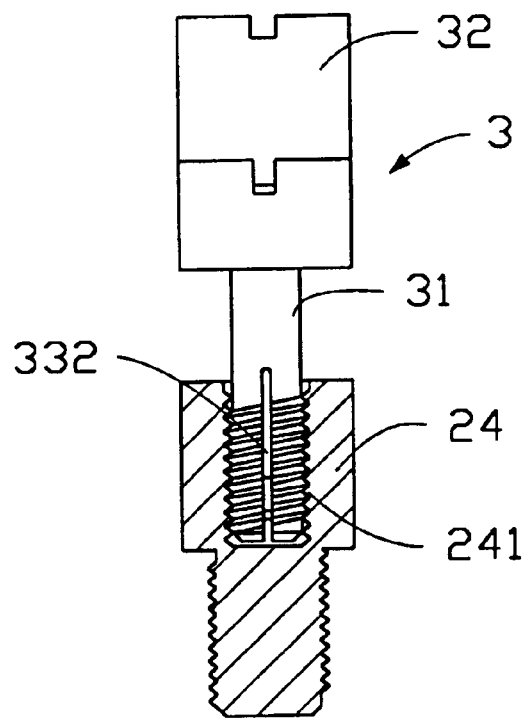
FIG. 4 is an assembled view of FIG. 3.
Figure 5:
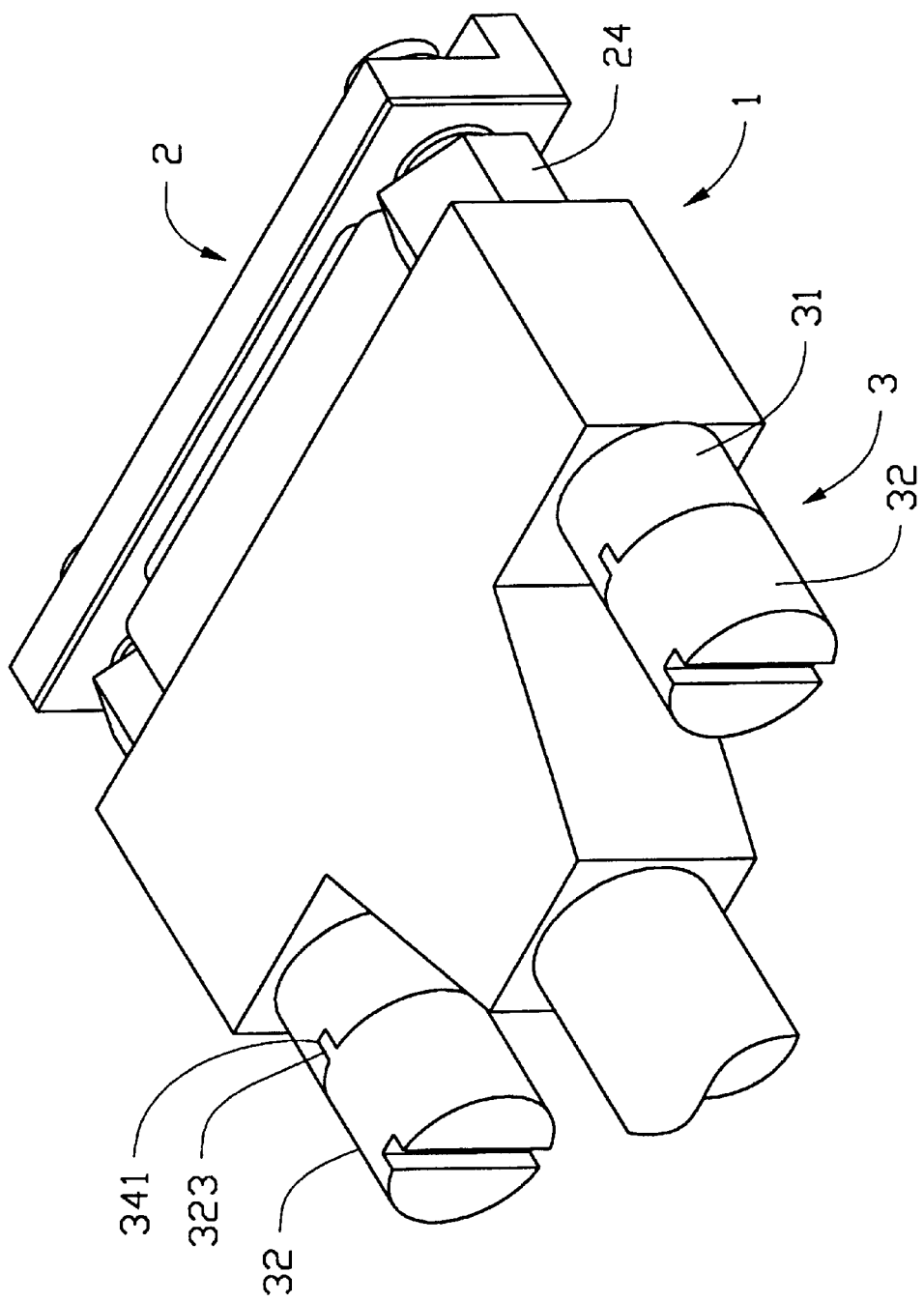
FIG. 5 is an enlarged, assembled view of FIG. 1.

When connecting the cable connector 1 to the plug connector 2, the bolt 24 is first extended through the aperture 211 of the plug connector 2 for attaching the plug connector 2 to the rear panel of the computer housing. The engaging rod 31 is then directly inserted into the hole 14 of the cable connector 1 and the screw hole 241 of the bolt 24. The inserting rod 32 is subsequently inserted into the through hole 35 of the engaging rod 31. Upon insertion of the free end 325 of the inserting rod 32, the slots 332 of the engaging rod 31 expand to latchably engage the outer screw thread 331 of the engaging rod 31 with the inner screw thread defined in the screw hole 241 of the bolt 24, best seen in FIG. 4. Thus, the cable connector 1 is rapidly secured to the plug connector 2 by a simple linear movement of the additional inserting rod 32 instead of the traditional laborious rotating operation, as shown in FIG. 5. The block 323 of the inserting rod 32 is engaged with the groove 341 of the engaging rod 31. When disassembling the cable connector 1, the inserting rod 32 is pulled out of the through hole 35 of the engaging rod 31 whereby each slot 332 of the engaging rod 31 resumes its original shape thereby facilitating a quick removal of the engaging rod 31 from the bolt 24.

Figure 6:
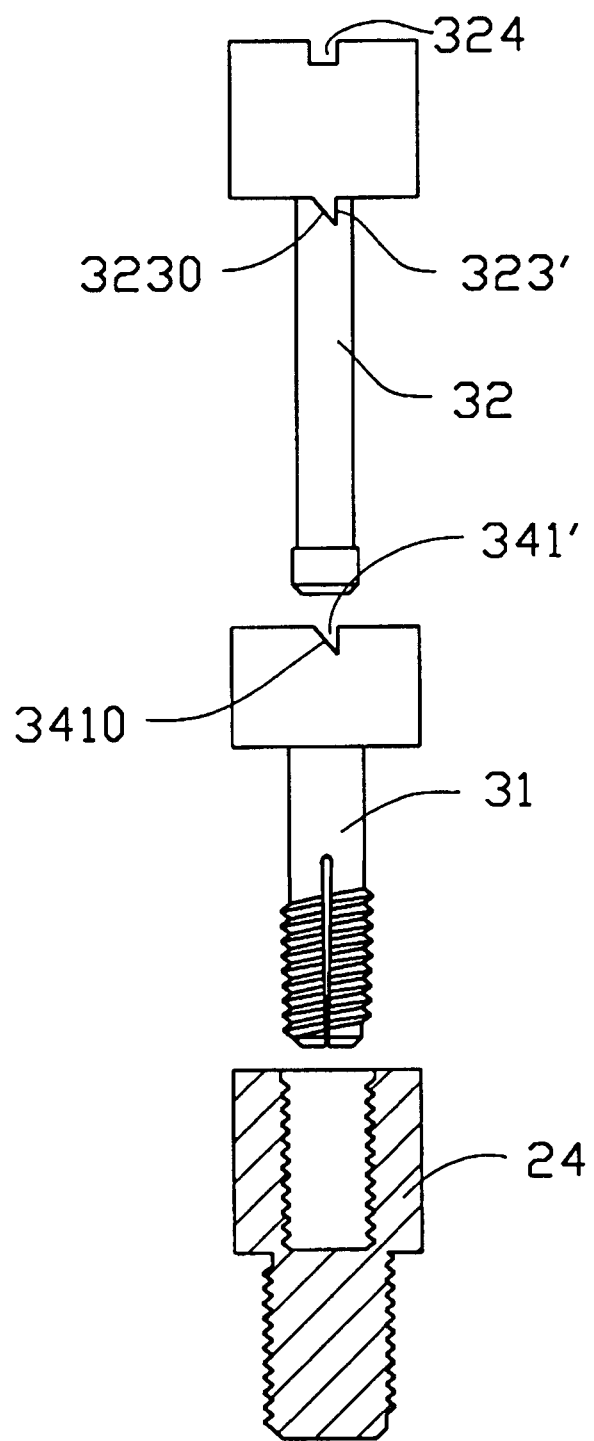
FIG. 6 is an exploded view of a locking device in accordance with a second embodiment and the bolt shown in cross-section.
Figure 7:
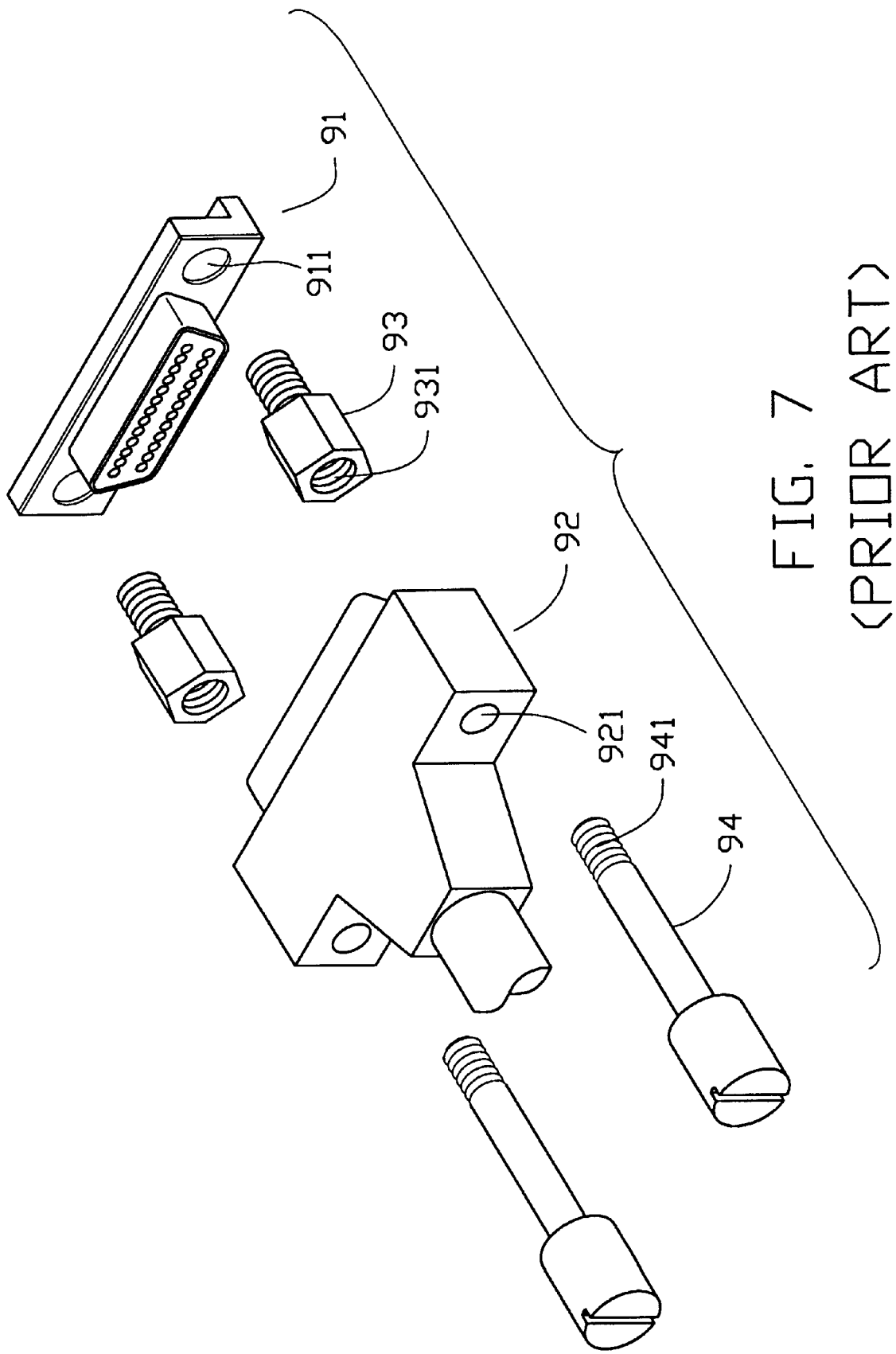
FIG. 7 is an exploded view of a connector assembly having a conventional locking device.

FIG. 6 illustrates a locking device in accordance with a second embodiment of the present invention. The engaging groove 341' of the engaging rod 31 comprises an inclined surface 3410. The engaging block 323' of the inserting rod 32 also comprises an inclined surface 3230 corresponding to the inclined surface 3410 of the groove 341' whereby the engaging block 323' properly engages with the groove 341'. It should be noted that other shapes of the groove 341' and the corresponding block 323' may be employed for achieving engagement therebetween. Since the other components of the second embodiment are substantially identical to those of the first embodiment, a detailed description thereof is omitted herein.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A locking device for engaging with a mating locking mechanism defining an inner screw thread therein, the locking device comprising:

an engaging rod comprising a through hole, a head with an engaging groove disposed in a top surface thereof, an outer screw thread defined around an end portion thereof, and a pair of elongate slots disposed in the end portion in communication with the through hole; and an inserting rod inserted into the through hole and engaged with the engaging groove of the engaging rod for expanding the elongate slots of the engaging rod whereby the outer screw thread of the engaging rod latchably engages the inner screw thread of the mating locking mechanism;

wherein the inserting rod comprises a cap with an engaging block extending from a bottom surface thereof for engaging with the engaging groove of the engaging rod.

2. The locking device as described in claim 1, wherein a diameter of the through hole in the end portion of the engaging rod is smaller than a diameter of the through hole in the rest of the length of the engaging rod.

3. The locking device as described in claim 1, wherein the slots gradually narrow along the engaging rod in a direction away from the head.

4. The locking device as described in claim 1, wherein the inserting rod comprises a free end having a diameter substantially equal to that of the through hole in the head of the engaging rod for expanding the slots of the engaging rod.

5. The locking device as described in claim 1, wherein the cap comprises a recess disposed in a top surface thereof for receiving an external tool to rotate the inserting rod.

6. The locking device as described in claim 1, wherein the engaging rod comprises four equidistantly disposed slots.

7. A locking device including:

mating locking mechanism defining a hole with internal threads therein;

an engaging rod including an expandable end with external threads thereon adapted to be freely inserted into the hole of the mating locking mechanism without engagement between the external threads of the engaging and the internal threads of the mating locking mechanism; and an inserting rod including an end adapted to coaxially engage with the engaging rod and outwardly diametrically expand the expandable end of the engaging rod whereby the internal threads of the mating locking mechanism and the external threads of the engaging rod may be threadedly engaged with each other for locking the mating locking mechanism and the engaging rod together;

wherein the inserting rod comprises a cap with an engaging block extending from a bottom surface thereof for engaging with the engaging groove of the engaging rod.

* * * * *